(12) United States Patent
Gaddam et al.

(10) Patent No.: US 12,052,218 B2
(45) Date of Patent: Jul. 30, 2024

(54) SYSTEMS AND METHODS TO SECURE API PLATFORMS

(71) Applicant: Visa International Service Association, San Francisco, CA (US)

(72) Inventors: Ajit Gaddam, Foster City, CA (US); Pushkar Joglekar, Emeryville, CA (US); Ara Jermakyan, Northridge, CA (US)

(73) Assignee: Visa International Service Association, San Francisco, CA (US)

( * ) Notice: Subject to any disclaimer, the term of this patent is extended or adjusted under 35 U.S.C. 154(b) by 759 days.

(21) Appl. No.: 17/255,966

(22) PCT Filed: Jun. 28, 2018

(86) PCT No.: PCT/US2018/040124
§ 371 (c)(1),
(2) Date: Dec. 23, 2020

(87) PCT Pub. No.: WO2020/005263
PCT Pub. Date: Jan. 2, 2020

(65) Prior Publication Data
US 2021/0328969 A1    Oct. 21, 2021

(51) Int. Cl.
*H04L 9/40* (2022.01)
*G06N 5/04* (2023.01)
*G06N 20/00* (2019.01)

(52) U.S. Cl.
CPC .............. *H04L 63/02* (2013.01); *G06N 5/04* (2013.01); *G06N 20/00* (2019.01); *H04L 63/102* (2013.01); *H04L 63/1425* (2013.01)

(58) Field of Classification Search
CPC ... H04L 63/02; H04L 63/102; H04L 63/1425; G06N 5/04; G06N 20/00; G06F 21/316; G06F 21/44; G06F 21/552
See application file for complete search history.

(56) References Cited

U.S. PATENT DOCUMENTS

| 9,754,105 | B1* | 9/2017 | López-Chicheri | ...... G06F 21/55 |
| 2003/0093696 | A1* | 5/2003 | Sugimoto | .............. G06Q 40/08 |
| | | | | 709/224 |

(Continued)

FOREIGN PATENT DOCUMENTS

EP    2947849    11/2015

OTHER PUBLICATIONS

Application No. PCT/US2018/040124, International Search Report and Written Opinion, Mailed on Feb. 25, 2019, 13 pages.

*Primary Examiner* — Khoi V Le
(74) *Attorney, Agent, or Firm* — Kilpatrick Townsend & Stockton LLP

(57) ABSTRACT

A method and system for protecting access to remote systems, such as resource databases containing sensitive resources, such as cryptographic keys or personally identifying information, is disclosed. A server can receive a plurality of access requests from a requesting entity. The server can identify an entity profile corresponding to the access requests, as well as a machine learning model corresponding to the entity profile. The access requests can be used to form access sequences, which can be evaluated by the machine learning model. The machine learning model returns an anomaly score that can be compared to a threshold. If the anomaly score exceeds the threshold, the server can prevent further access to the remote system, for example, by revoking a credential associated with the requesting entity.

16 Claims, 7 Drawing Sheets

(56) References Cited

U.S. PATENT DOCUMENTS

| | | | |
|---|---|---|---|
| 2015/0319185 A1* | 11/2015 | Kirti | H04L 63/1416 |
| | | | 726/23 |
| 2016/0080345 A1* | 3/2016 | Safruti | G06F 21/552 |
| | | | 726/6 |
| 2016/0308900 A1* | 10/2016 | Sadika | H04L 63/1441 |
| 2017/0054723 A1* | 2/2017 | Maple | H04L 67/141 |
| 2017/0063902 A1* | 3/2017 | Muddu | H04L 41/22 |
| 2018/0115578 A1* | 4/2018 | Subbarayan | H04L 63/04 |
| 2018/0349602 A1* | 12/2018 | Johns | G06F 21/552 |

* cited by examiner

Service Account 1

| Model | Validation Accuracy | TPR | FPR | FNR | TNR | Sequences Detected | F1 Anomaly |
|---|---|---|---|---|---|---|---|
| Isolation Forest samples:200 | 96.248% | 96.12% | 3.88% | 0.00% | 100.00% | 100% | 96.00% |
| Isolation Forest samples:300 | 97.793% | 96.12% | 3.88% | 0.00% | 100.00% | 100% | 96.00% |
| One-Class SVM Kernel:RBF, gamma:.1 | 98.154% | 98.45% | 1.55% | 0.00% | 100.00% | 100% | 98.36% |
| One-Class SVM Kernel:RBF, gamma:.3 | 99.976% | 93.80% | 6.20% | 0.00% | 100.00% | 100% | 93.75% |
| One-Class SVM Kernel:RBF, gamma:.9 | 99.993% | 73.64% | 26.36% | 0.00% | 100.00% | 100% | 77.92% |
| One-Class SVM Kernel:Poly, gamma:.1 | 84.825% | 96.90% | 3.10% | 0.00% | 100.00% | 100% | 96.77% |
| One-Class SVM Kernel:Poly, gamma:.3 | 84.848% | 96.12% | 3.88% | 0.00% | 100.00% | 100% | 96.00% |
| One-Class SVM Kernel:Sigmoid, gamma:.1 | 21.282% | 100.00% | 0.00% | 100.00% | 0.00% | 0% | 0.00% |

FIG. 5

Service Account 2

| Model | Validation Accuracy | TPR | FPR | FNR | TNR | Sequences Detected | F1 Anomaly |
|---|---|---|---|---|---|---|---|
| Isolation Forest samples:200 | 81.131% | 95.92% | 4.08% | 63.33% | 36.67% | 40% | 51.16% |
| Isolation Forest samples:300 | 92.069% | 93.88% | 6.12% | 8.33% | 91.67% | 100% | 90.91% |
| One-Class SVM Kernel:RBF, gamma:.1 | 99.797% | 91.84% | 8.16% | 0.00% | 100.00% | 100% | 93.75% |
| One-Class SVM Kernel:RBF, gamma:.3 | 99.995% | 84.69% | 15.31% | 0.00% | 100.00% | 100% | 88.89% |
| One-Class SVM Kernel:RBF, gamma:.9 | 99.999% | 66.33% | 33.67% | 0.00% | 100.00% | 100% | 78.43% |
| One-Class SVM Kernel:Poly, gamma:.1 | 67.284% | 87.76% | 12.24% | 0.00% | 100.00% | 100% | 90.91% |
| One-Class SVM Kernel:Poly, gamma:.3 | 67.362% | 87.76% | 12.24% | 0.00% | 100.00% | 100% | 90.91% |
| One-Class SVM Kernel:Sigmoid, gamma:.1 | 33.716% | 96.94% | 3.06% | 40.00% | 60.00% | 60% | 72.73% |

FIG. 6

Privileged User

| Model | Validation Accuracy | TPR | FPR | FNR | TNR | Sequences Detected | F1 Anomaly |
|---|---|---|---|---|---|---|---|
| Isolation Forest samples:200 | 38.375% | 88.89% | 11.11% | 86.67% | 13.33% | 0% | 23.19% |
| Isolation Forest samples:300 | 38.375% | 88.89% | 11.11% | 86.67% | 13.33% | 0% | 23.19% |
| One-Class SVM Kernel:RBF, gamma:.1 | 83.932% | 55.56% | 44.44% | 55.00% | 45.00% | 40% | 59.34% |
| One-Class SVM Kernel:RBF, gamma:.3 | 98.325% | 55.56% | 44.44% | 15.00% | 85.00% | 100% | 88.70% |
| One-Class SVM Kernel:RBF, gamma:.9 | 99.997% | 0.00% | 100.00% | 0.00% | 100.00% | 100% | 93.02% |
| One-Class SVM Kernel:Poly, gamma:.1 | 53.385% | 77.78% | 22.22% | 25.00% | 75.00% | 80% | 84.11% |
| One-Class SVM Kernel:Poly, gamma:.3 | 53.343% | 77.78% | 22.22% | 25.00% | 75.00% | 80% | 84.11% |
| One-Class SVM Kernel:Sigmoid, gamma:.1 | 19.591% | 100.00% | 0.00% | 85.00% | 15.00% | 20% | 26.09% |

FIG. 7

SYSTEMS AND METHODS TO SECURE API PLATFORMS

This application is a 35 U.S.C. 371 patent application of international application number PCT/US2018/040124, filed on Jun. 28, 2018, which is herein incorporated by reference in its entirety for all purposes.

BACKGROUND

As technology continues to advance, organizations such as governments and businesses have gained the capability to store increasing amounts of data in their databases. Additionally, such organizations have increasingly relied on the use of remote systems, accessible by application programming interfaces (APIs) to fulfill their functions. In many cases, this data include organizations' most sensitive data, including forms of personally identifiable information (PII). In turn, these databases present a target-rich environment for hackers and other entities who look to gain access and perform data extraction for personal, financial, or malicious reasons. Likewise, hackers and other malicious entities may target such remote systems in order to disrupt, disable, or otherwise prevent organizations from performing their intended functions.

Organizations typically have strong external security perimeters and controls to repel external attackers. However, an attacker that successfully penetrates the external security perimeter or a malicious trusted insider are not subject to the same level of scrutiny. These "internal attacks" are more effective than external attacks because the attacker is in possession of trusted credentials, security is relaxed and security triggers can be easily circumvented, and the attacker may have physical access to computer systems.

In many databases, sensitive data are sometimes encrypted or tokenized. As such, cryptographic materials (e.g., cryptographic keys) frequently serve as the last line of defense against data breaches. Extraction of cryptographic keys can allow an attacker to decrypt protected data. As such, attackers frequently try to find and extract cryptographic keys.

Conventional monitoring systems are usually not provided access to cryptographic keys, and as such, conventional monitoring system typically cannot inspect encrypted data flowing through organizational networks. Therefore, attackers can potentially bypass an organization's monitoring system by extracting encrypted data, targeting a Secret Management System (SeMS) to extract cryptographic keys, then performing offline decryption of the stolen data.

In some cases, attackers may not attempt to steal sensitive resources from organizational databases, and instead may try to disrupt, damage or misuse remote systems. For example, an attacker may attempt to access a power plant control system in order to cause a blackout.

Thus, there is a need to protect cryptographic keys and other sensitive resources from being extracted from databases and other systems, as well as generally protect remote systems from attackers that have successfully breached a security perimeter.

Embodiments of the invention solve these and other problems individually and collectively.

SUMMARY

Embodiments of the invention are directed to methods and systems for detecting attacks on remote systems, such as fraudulent attempts to access resources in a resource database. The resource database can store data records, including sensitive or secret data, such as cryptographic keys, financial account numbers, or personally identifiable information (PII).

These methods can be performed by a server that manages and services access requests to a remote system. This server can be a database server that manages and services database access requests (in which case the remote system is a database). Requesting entities (e.g., client computers, applications, or users) can interface with the server and request access to the remote system via one or more application programming interfaces (APIs).

Although embodiments of the invention can be employed to protect any number of varied remote systems, the discussion and figures below primarily focus on resource databases. As such, the server is frequently referred to as a "database server," the remote system is frequently referred to as a "database," and access requests are frequently referred to as "database access requests." It should be understood that the use of this terminology is in order to clearly describe exemplary applications and embodiments of the invention. It should further be understood that embodiments of the invention could be used to detect and prevent fraudulent access to any number of other appropriate remote systems, such as power grids, manufacturing plants, etc.

Database access requests can include requests to read data or records off the resource database. Database access requests can also include database queries, requests for information about the requesting entity, and requests for information about the requesting entity's permissions and privileges among others.

In order to detect fraudulent attempts to access resources in the resource database, the database server can identify the requesting entity and a requesting entity profile associated with the requesting entity. Each entity that requests data from the resource database may have its own requesting entity profile that includes information about the requesting entity. These requesting entity profiles may be stored in an entity profile database and accessed by the database server. Additionally, each requesting entity profile may have a corresponding machine learning model, which may be stored in a model cache and accessed by the database server, such that each unique requesting entity has its own corresponding machine learning model.

These machine learning models accept database access requests or sequences of database access requests (referred to as "access sequences") as feature vectors and produce anomaly scores. The anomaly scores can classify database access requests or access sequences as normal or anomalous. The database server can compare the anomaly score to a predetermined threshold. If the anomaly score exceeds the predetermined threshold, the database server can prevent the requesting entity from further accessing the resource database.

Embodiments of the invention present a number of advantages over conventional systems. As a first example, the novel use of access sequences to detect anomalous behavior allows embodiments of the invention to accurately detect fraudulent database access requests. Test results for different machine learning models (described below with reference to FIGS. 5-7) demonstrate the accuracy of embodiments of the invention. Further, the use of deep, obfuscated databases (described below with reference to FIGS. 3A-3B) forces attackers to perform additional reconnaissance, making attackers more susceptible to detection. Additionally, by evaluating access requests across APIs, rather than just at a single API, the database server can detect additional anomalous behavior, such as frequently jumping from one API to another in order to gain access. As a result, embodiments of the invention provide an improvement to the security of databases storing sensitive data, such as cryptographic keys or PII.

One embodiment is directed to a method comprising: receiving, by a server, a plurality of access requests from a requesting entity, wherein the plurality of access requests are received via one or more APIs and are a plurality of requests to access a remote system; determining, by the server, a requesting entity profile associated with the plurality of access requests; determining, by the server, a machine learning model corresponding to the requesting entity profile; generating, by the server, an access sequence, wherein the access sequence comprises an ordered sequence of the plurality of access requests; determining, by the server, an anomaly score by applying the access sequence as an input to the machine learning model; comparing, by the server, the anomaly score to a predetermined threshold; if the anomaly score is greater than the predetermined threshold, preventing, by the server, the requesting entity from accessing the remote system; and if the anomaly score is less than the predetermined threshold, allowing, by the server, the requesting entity to access the remote system.

Another embodiment is directed to a server comprising: a processor; and a non-transitory computer readable medium comprising code, executable by the processor, for implementing the above method.

TERMS

A "server computer" may include a powerful computer or duster of computers. For example, the server computer can be a large mainframe, a minicomputer duster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers or requesting entities.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "resource" can include something that can be provided to an entity. A resource can be electronic, and may include code, data, or other information that can be transmitted between entities electronically, for example, digital representations of music, cryptographic keys, PII, medical records, images, video, etc.

An "identifier" may refer to something that uniquely identifies something. An example of an identifier is a user identifier, which uniquely identifies a user, or a device identifier, which uniquely identifies a device. An identifier can be a numeric or alphanumeric sequence, such as a social security number. Further, an identifier may be used to identify data associated with an identified entity. For example, an identifier may be used to search an entity profile database in order to identify a profile associated with an entity.

"Entities" can include things with distinct and independent existence. For example, people, organizations (for example, partnerships, businesses), computers, and computer networks, among others. An entity can communicate or interact with its environment in some manner. Further, an entity can operate, interface, or interact with a computer or computer network during the course of its existence.

An "entity credential" may include something that indicates an entity's privileges or entitlement. These privileges may include accessing resource databases, specific records, directories, or other logical elements of those databases. A credential may be data, such as an alphanumeric sequence or sequences that an entity can present. For example, an entity credential may comprise a username and password, or an API key used to access an API. An entity credential may be verified by a database server in order to authenticate an entity and allow the entity to access a resource database.

A "requesting entity" can include an entity that requests access to something, such as a resource or a resource database. For example, a requesting entity can include a user that requests access to cryptographic keys stored on an SeMS. A requesting entity can also include the computer that the user operates in order to request access to resources.

An "entity profile" can include a profile or collection of data about an entity, such as a requesting entity. An entity profile can be determined from an access request produced by a requesting entity. For example, an entity profile for a human user could comprise information including a user identifier (such as a name), a user's home or work address, the user's age, the user's acquaintances, etc. An entity profile can comprise information that can be used to uniquely identify the entity associated with an entity profile. Entity profiles can be represented electronically and can be stored in an entity profile database or other suitable data structure.

An "application programming interface" (API) can include a set of subroutines, protocols, and tools for building application software or interfacing with an application. For example, an API can be used by a client computer in order to communicate with an application running on a server computer. A client computer can use an API to request that a server computer retrieve data from a database coupled to the server computer and transmit that data to the client computer. An API may be identified using an API identifier, a unique alphanumeric sequence corresponding to an API. APIs may additionally correspond to different applications, such that one application (e.g., a fraud detection system system) uses a different API than another application (e.g., a transaction processing system).

An "application programming interface key" (API key) can include a cryptographic key used in conjunction with an API. For example, an API can be configured such that a requesting entity cannot communicate with a database server unless they provide the correct API key.

A "Secret Management System" (SeMS) may include a database that manages or otherwise stores secret, sensitive information, or resources. An example of a secret management system is a database that stores one or more cryptographic keys that may be used to decrypt sensitive information such as PII. An SeMS may be a special class of a "resource database," a database that stores data and other electronic resources.

"Personally Identifiable Information" (PII) may include information that can be used on its own or with other information to identify, contact, or locate a single person, or to identify an individual. Personally identifying information may be a target for identity thieves or hackers, and may be encrypted or otherwise protected in a database. A social security number is an example of PII.

A "database server" may include a server computer that controls or manages access to resources. A database server may manage database access requests on behalf of requesting entities. Requesting entities may interface with the database server via API calls made at one or more APIs. A database server may authenticate requesting entities based on entity credentials before granting further access to resources in a resource databases. Further, a database server may evaluate database access requests or access sequences using machine learning models, in order to identify malicious or fraudulent requests. A database server may have the ability to issue or revoke credentials, or otherwise allow or deny access to a resource database, or resources in the resource database.

A "database layer" may include a logical element in a database. An example of a layer is a directory level in a hierarchical database. A directory is deeper than its parent directory and less deep than its subdirectories. Thus, the depth of a database layer may refer to how far "down" it is in the database. A "deep layer" may refer to a layer that is deep in a database, such as a layer that is 5 or more layers deep.

An "access request" may include a request to access a remote system. This may include systems such as manufacturing or energy control systems, camera or other surveillance systems, and the like. It may also include requests to access databases or filing systems. An access request may include commands or other directives associated with the access request. For example, an access request to a computerized gate system may comprise an electronic command or directive to open a corresponding computerized gate.

A "database access request" may include a request to access a database. Examples of database access requests include "read requests" or "database read requests," which can be requests to read or retrieve data from a database, "list requests" or "database list requests," which can be requests to retrieve a list of files, directories, or logical sections in a database, "entity information requests," which can be requests to retrieve information or data about a particular entity or the entity's account or profile, "entity capability requests," which can be requests to retrieve information about the capabilities or permissions of an entity, such as information regarding which data records and directories the entity is allowed to access, and "change directory requests," which can be requests to move to a different logical section or directory in the database. Database access requests may also include data or metadata about the database access request, such as where the request originated from, a timestamp corresponding to the request, the API through which the request was made, a credential of a requesting entity making the request, etc.

An "access sequence" may include a series or sequence of access requests. For example, an access sequence comprising four database access requests may comprise a list request, followed by change directory request, followed by a list request, followed by a read request. Access sequences may be ordered chronologically, for example, via timestamps corresponding to the database access requests. An access sequence may be used as a feature vector input to a machine learning model, in order for the machine learning model to produce an anomaly score output, indicating whether the access sequence is normal or anomalous.

An "attack sequence" may include an access sequence produced during an attack on a remote system or an attempt to extract data from a database. An attack sequence may have a number of characteristic properties that make it possible to tell the difference between an attack sequence and a legitimate access sequence. For example, an attack sequence may indicate that a requesting entity is attempting to locate a sensitive resource, or otherwise performing reconnaissance.

The term "machine learning model" may include an application of artificial intelligence that provides systems with the ability to automatically learn and improve from experience without explicitly being programmed. A machine learning model may include a set of software routines and parameters that can predict an output of a process (e.g., identification of an attacker of a computer network, authentication of a computer, a suitable recommendation based on a user search query, etc.) based on a "feature vector." A structure of the software routines (e.g., number of subroutines and relation between them) and/or the values of the parameters can be determined in a training process, which can use actual results of the process that is being modeled, e.g., the identification of normal or anomalous access sequences. Examples of machine learning models include support vector machines, models that classifies data by establishing a gap or boundary between inputs of different classifications, as well as neural networks (i.e., collections of artificial "neurons" that perform functions by activating in response to inputs).

A "feature vector" can include a set of measureable properties (or "features") that represent some object or entity. A feature vector can include collections of data represented digitally in an array or vector structure. A feature vector can also include collections of data that can be represented as a mathematical vector, on which vector operations such as the scalar product can be performed. A feature vector can be determined or generated from database access requests. A feature vector can be used as the input to a machine learning model, such that the machine learning model produces some output or classification. A feature vector can comprise one or more features. For example, a feature vector for a human entity can include features such as age, height, weight, a numerical representation of their relative happiness, etc. Feature vectors can be represented and stored electronically, in for example, a feature vector database or feature store. Further, a feature vector can be normalized, i.e., be made to have unit length.

An "anomaly score" may refer to a score that indicates how normal or abnormal something is. For example, an anomaly score can indicate how abnormal a requesting entity's behavior is, or how abnormal an access sequence is. An anomaly score can be within a defined range, such as $0 \rightarrow 1$, $-1 \rightarrow 1$ or $0 \rightarrow 100$. An anomaly score can be compared against a threshold in order to make a decision. For example if an anomaly score exceeds a threshold (indicating an anomalous access sequence) a database server can revoke a requesting entity's credential, or otherwise prevent a requesting entity from accessing a resource database.

A "model cache" can include a database that can store machine learning models. Machine learning models can be stored in a model cache in a variety of forms, such as collections of parameters or other values defining the machine learning model. Models stored in a model cache may be stored in association with entity profiles, such that each model in the model cache corresponds to a specific entity profile. Models in a model cache may also be stored in association with keywords that communicate some aspect of the model. For example, a model used to evaluate entity behavior in accessing resources may be stored in a model cache in association with the keywords "behavior," "resource access," and "security." Database servers can access a model cache or model caches and retrieve models from the cache, modify models in the cache, delete models from the cache, or add models to the cache. Additionally, database servers can modify any associations between models and entity profiles, keywords, or the like.

BRIEF DESCRIPTION OF THE DRAWINGS

FIG. 5 shows a table of attack sequence detection rates for different machine learning models, corresponding to a test for a first application service profile.

FIG. 6 shows a table of attack sequence detection rates for different machine learning models, corresponding to a test for a second application service profile.

FIG. 7 shows a table of attack sequence detection rates for different machine learning models, corresponding to a test for a privileged user profile.

DETAILED DESCRIPTION

Figure 1:
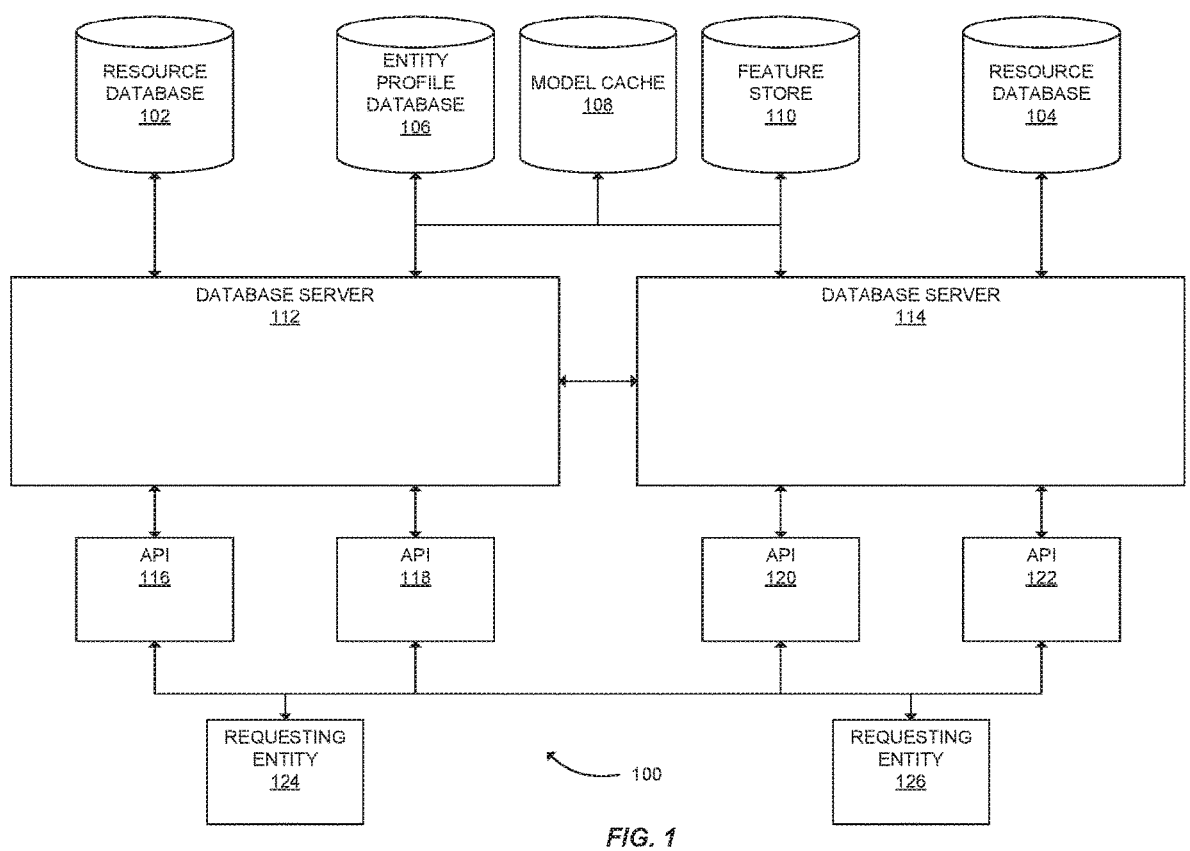
FIG. 1 shows a block diagram of an exemplary database access system according to some embodiments of the invention.

Embodiments of the invention are directed to methods and systems for detecting attacks on remote systems, such as fraudulent attempts to access resources in a resource database, such as cryptographic keys and PII. The figures and description below primarily focus on preventing fraudulent access to a resource database, although it should be understood that this is only one exemplary application of embodiments of the invention, and that other equally valid applications exist.

For example, a remote system could comprise an automobile manufacturing plant control system used to automate the manufacturing of critical components such as V6 engines. An attacker, such as a competing automobile manufacturer or disgruntled employee may attempt to access the plant control system in order to disrupt the production or quality of the V6 engines. To this end they may issue access requests to a server computer via one or more APIs, such as "reduce cylinder head milling by 15%" in order to decrease the size of milled holes in the cylinder head, preventing components such as valves, spark plugs, and fuel injectors from being mounted on the cylinder head at later production stages. The server computer can use machine learning to identify anomalous access requests and access sequences in order to prevent such attacks on remote systems.

In the case of detecting fraudulent access to resource databases, a database server can be used to control access to resource databases. The database server can receive database access requests via APIs that requesting entities use to communicate with the database server. These requesting entities can include, for example, user computer terminals, or applications that request data from the database in order to perform their functions, such as a fraud detection application or a transaction fulfillment application.

The database server can use machine learning to determine if a requesting entity is behaving anomalously. Each requesting entity has a corresponding machine learning model that models the requesting entity's behavior, i.e., the qualities of database access requests produced by the requesting entity, or access sequences derived from those requests. For example, normal behavior for a given entity may involve interfacing with the database server via a particular API, and transmitting a small number of database access requests during normal business hours (e.g., 9:00 A.M. to 5:00 P.M.). Anomalous behavior, on the other hand, may involve interfacing with the database server via a number of different APIs, and transmitting a large number of database access requests during unusual times (e.g., 1:00 A.M.).

The machine learning model produces an anomaly score that indicates how anomalous the requesting entity's behavior is. This anomaly score can be compared against a predetermined threshold. If the anomaly score exceeds the predetermined threshold, the machine learning model can prevent the requesting entity from further access to the resource database. This may comprise, for example, revoking a credential associated with the requesting entity.

Anomalous behavior can be indicative of fraud. Particularly, it may indicate that a credential (such as a username and password or API key) corresponding to a requesting entity has been stolen by an attacker. However, an attacker is unlikely to be able to extract resources from the resource database without deviating from normal behavior for that requesting entity.

Further, attackers typically do not have complete knowledge of the system they are breaching. As such, attackers often perform "reconnaissance," in which they attempt to determine the permissions and privileges of the entity they are impersonating, as well as identify the location in the resource database of valuable resources, such as cryptographic keys. As a result, access sequences produced by attackers typically show evidence of this reconnaissance, including "jumping" between APIs and long, variable access sequences. This is in contrast to a legitimate requesting entity's access sequence, which will typically be short, consistent, and presented via a single API. The machine learning model can recognize these reconnaissance patterns and report anomalous behavior.

Further, some embodiments of the invention involve using an obfuscated and/or deep resource database. An obfuscated database identifies or labels data records or directories in such a way that they are difficult to parse. For example, rather than labelling a directory "secrets," the directory could be labeled "A2FD." In a deep database, valuable resources are stored on deeper database layers or directories. By obfuscating the database and making the database deeper, it is more difficult for attackers to locate valuable sensitive resources. This in turn forces attackers to perform more reconnaissance, making it easier for them to be detected using the machine learning models.

FIG. 1 shows an exemplary system 100 according to some embodiments of the invention. The system 100 comprises resource databases 102 and 104, entity profile database 106, model cache 108, feature store 110, database servers 112 and 114, APIs 116, 118, 120, and 122, and requesting entities 124 and 126.

Although two resource databases 102 and 104, two database servers 112 and 114, four APIs 116, 118, 120, and 122, and two requesting entities 124 and 126 are shown, methods according to embodiments of the invention can be practiced with any number of resource databases 102 and 104, database servers 112 and 114, APIs 116, 118, 120, and 122, and requesting entities 124 and 126. FIG. 1 is intended to illustrate an exemplary arrangement of databases, database servers, APIs, and requesting entities according to some embodiments of the invention, and is not intended to be limiting.

The entities, servers, databases, and APIs can communicate with one another via any appropriate means, including a communications network. Messages and other communications between the entities, servers, databases and APIs may be in encrypted or unencrypted form. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as but not limited to a Wireless Application Protocol (WAP), I-mode, and/or the like); and/or the like. Messages between the devices and computers may be transmitted using a secure communications protocol such as, but not limited to, File Transfer Protocol (FTP); Hypertext transfer Protocol (HTTP); Secure Hypertext Transfer Protocol (HTTPS), Secure Socket Layer (SSL) and/or the like.

Resource databases 102 and 104 can include any appropriate data structures for storing digital resources, including sensitive digital resources such as cryptographic keys, financial account numbers, or PII, among others. Due to the sensitive nature of these digital resources, resource databases 102 and 104 may be protected by underlying hardware or software security. Resource databases 102 and 104 may store digital resources in encrypted or unencrypted form. Resource databases 102 and 104 may be accessed by database servers 112 and 114 through appropriate access means, for example, database queries such as SQL queries. In some embodiments, resource databases 102 and 104 may be isolated, such that resource database 102 can only be accessed by database server 112 and resource database 104 can only be accessed by database server 114. In some embodiments, resource databases 102 and 104 may be implemented on a standalone computer or server computer. In other embodiments, resource databases 102 and 104 may be implemented on computer systems that also implement database servers 112 and 114.

Data records in resource databases 102 and 104 may be organized in any appropriate structure or form. As an example, resource databases 102 and 104 could be relational databases, where data is organized into sets with defining attributes and represented in tables. As another example, resource databases 102 and 104 can be hierarchical databases, where data records are organized into a tree-like structure. Resource databases 102 and 104 can be organized into different directories or database layers, each containing data records and subdirectories or links to deeper database layers. In some embodiments, resource databases 102 and 104 may comprise a plurality of layers, and protected resources may be stored on deep layers of resource databases 102 and 104.

In some embodiments, resource databases 102 and 104 may be deep and/or obfuscated. A deep database comprises more database layers or directories than a "shallow" database, and sensitive data records are stored in deeper database layers or database directories. In an obfuscated database, identifiers corresponding to data records or directories are modified in order to hide information from entities accessing the database. As an example, rather than naming a directory "cryptographic keys" a directory could be identified by the string "A12D." In this way, it is more difficult for an attacker to locate valuable resources, increasing the amount of reconnaissance the attacker has to perform and increasing the likelihood that the attacker is detected. Differences between shallow databases and deep and obfuscated databases are discussed further below with reference to FIGS. 3A-3B.

Entity profile database 106 may store data records of entity profiles corresponding to each requesting entity 124 and 126. These data records may include entity identifiers, such as a name or other alphanumeric sequence associated with each requesting entity 124 and 126. As examples, a requesting entity corresponding to a human user "John Doe" may have an identifier such as "JDoe," while a requesting entity corresponding to a shared computer workstation may have an identifier such as "DESK_322A." The data records may include other information about requesting entities 124 and 126, including locations, IP addresses, associated communication addresses, such as email addresses or telephone numbers, whether the requesting entity is associated with an organization, whether the requesting entity is human or machine, etc. In some embodiments, entity profile database 106 may be implemented on a standalone computer or server computer. In other embodiments, entity profile database 106 may be implemented on one or more computer systems implementing database servers 112 and 114. Further, data records in entity profile database 106 may be linked or stored in association with machine learning models stored in model cache 108.

Model cache 108 can include any appropriate data structure for storing machine learning models. Model cache 108 may be implemented on a standalone computer or server computer, or implemented on one or more computer systems that implement database servers 112 and 114. The machine learning models stored in model cache 108 may evaluate requesting entity behavior based on database access requests and request sequences, and output an anomaly score that indicates whether the database access requests are normal or anomalous. In some embodiments, each machine learning model may correspond to a requesting entity, such that each requesting entity's behavior is modeled by a dedicated machine learning model. Additionally, model cache 108 may store multiple machine learning models corresponding to each requesting entity, such as a current model and a number of past models. For example, each month a new machine learning model may be trained for a requesting entity, and the new machine learning model, along with the prior machine learning models are all stored in model cache 108.

Models in model cache 108 may be stored in any appropriate form, such as a collection of parameters and/or weights (e.g., weights corresponding to a neural network machine learning model). Models in model cache 108 may be indexed by a corresponding entity identifier, a model identifier, or the "type" of machine learning model (e.g., recurrent neural network, isolation forest, support vector machine, etc.). Models stored in model cache 108 may be retrieved, trained, and/or used to evaluate database access requests by database servers 112 and 114. The models may be trained on labelled feature vectors stored in feature store 110.

Feature store 110 may be any appropriate data structure for storing labeled or unlabeled feature vectors. Feature store 110 may be implemented on a standalone computer or server computer, or implemented on one or more computer systems that implement database servers 112 and 114. The feature vectors in feature store 110 may comprise database access requests corresponding to entity profiles. For example, a feature vector may comprise a query to read data file "secret_key" on Jun. 14, 2018, 2:53.32 P.M. from requesting entity "AG" originating from API "Android-8." Feature vectors stored in feature store 110 may have corresponding labels, such as normal or anomalous. In some cases, feature vectors stored in feature store 110 may be labeled with an anomaly score, such as 99/100. A high anomaly score may indicate that the labelled feature vector corresponds to an anomalous database access request. In some embodiments, feature vectors stored in feature store 110 may correspond to access sequences comprising a number of ordered database access requests. The feature vectors in feature store 110 may be used by database servers 112 and 114 to train machine learning models stored in model cache 108. Additionally, database servers 112 and 114 may write database access requests received from requesting entities 124 and 126 via APIs 116, 118, 120, and 122 to feature store 110.

Database servers 112 and 114 are server computers that mediate and control access to resource databases 102 and 104. Database servers 112 and 114 receive database access requests from requesting entities 124 and 126 via APIs 116, 118, 120, and 122, perform the requests, and then return the results. For example, requesting entity 124 may want a list of the contents of a directory in resource database 102. Requesting entity 124 may generate a list request and transmit it to database server 112 via API 116. Database server 112 may access resource database 102 and retrieve a list of data records and subdirectories and transmit the list back to requesting entity 124. Database server 112 may authenticate requesting entities 124 and 126, and/or manage or verify credentials corresponding to requesting entities 124 and 126, such as username-password pairs or API keys. Database servers 112 and 114 may maintain credential databases for this purpose. A requesting entity attempting to access resource database 102 may need a valid credential in order for it to communicate database access requests to database servers 112 and 114.

Database servers 112 and 114 may protect resource databases 102 and 104 from unauthorized access by enforcing database access restrictions or preventing requesting entities 124 and 126 from accessing resource databases 102 and 104. For example, database servers 112 and 114 may enforce permissions or privileges that define which directories requesting entities 124 and 126 are allowed to access. As another example, database servers 112 and 114 may revoke credentials corresponding to compromised requesting entities.

Database servers 112 and 114 may receive resource access requests from requesting entities 124 and 126 via APIs 116, 118, 120, and 122. Database servers 112 and 114 may verify that credentials presented with the database access requests are valid. From these resource access requests, database servers 112 and 114 may determine requesting entity profiles and retrieve the requesting entity profiles from entity profile database 106. The requesting entity profiles may be determined by querying entity profile database 106 using a requesting entity identifier or a requesting entity credential. Database servers 112 and 114 may further determine and retrieve a machine learning model corresponding to the requesting entity, for example, from model cache 108.

Database servers 112 and 114 may generate access sequences comprising ordered sequences of the database access requests. The access sequences may be generated by collecting the received database access requests and ordering them based off timestamps corresponding to the database access requests. Additionally, database servers 112 and 114 may receive additional database access requests from the other database servers, which may additionally be included in the access sequence.

The access sequences may be used as inputs to the determined machine learning model. The machine learning model may produce an anomaly score, which database servers 112 and 114 may compare to a threshold. If the anomaly score exceeds the threshold (i.e., the access sequence is likely anomalous, malicious, or fraudulent), database servers 112 and 114 can prevent the requesting entity from continuing to access resource databases 102 and 104. Otherwise, database servers 112 and 114 can continue to allow requesting entities 124 and 126 to access resource databases 102 and 104, and database servers 112 and 114 can continue to perform database access requests on behalf of requesting entities 124 and 126.

Application Programming Interfaces (APIs) 116, 118, 120, and 122 may be used to allow different software and hardware components to interface and communicate with database servers 112 and 114. These APIs 116, 118, 120, and 122 may allow different requesting entities 124 and 126 to request data from the resource database. Different APIs may correspond to different device operating systems, and may allow devices of different operating systems to communicate with database servers 112 and 114. APIs 116, 118, 120, and 122 may be accessed via API calls, including database access requests. In order to utilize a particular API, requesting entities 124 and 126 may need an API key corresponding to that API. This API key may serve as a credential, indicating that requesting entities 124 and 126 are authorized to transmit database access requests and receive data via APIs 116, 118, 120, and 122.

Requesting entities 124 and 126 may comprise entities that attempt to access resource databases 102 and 104. Requesting entities 124 and 126 may include entities such as users, user computers or work stations, shared workstations, remote server computers, or applications that interface with database servers 112 and 114 via APIs 116, 118, 120, and 122. Requesting entities 124 and 126 may include legitimate entities attempting to retrieve resources for legitimate purposes, as well as fraudulent entities (such as hackers) attempting to retrieve resources for fraudulent purposes.

Figure 2:
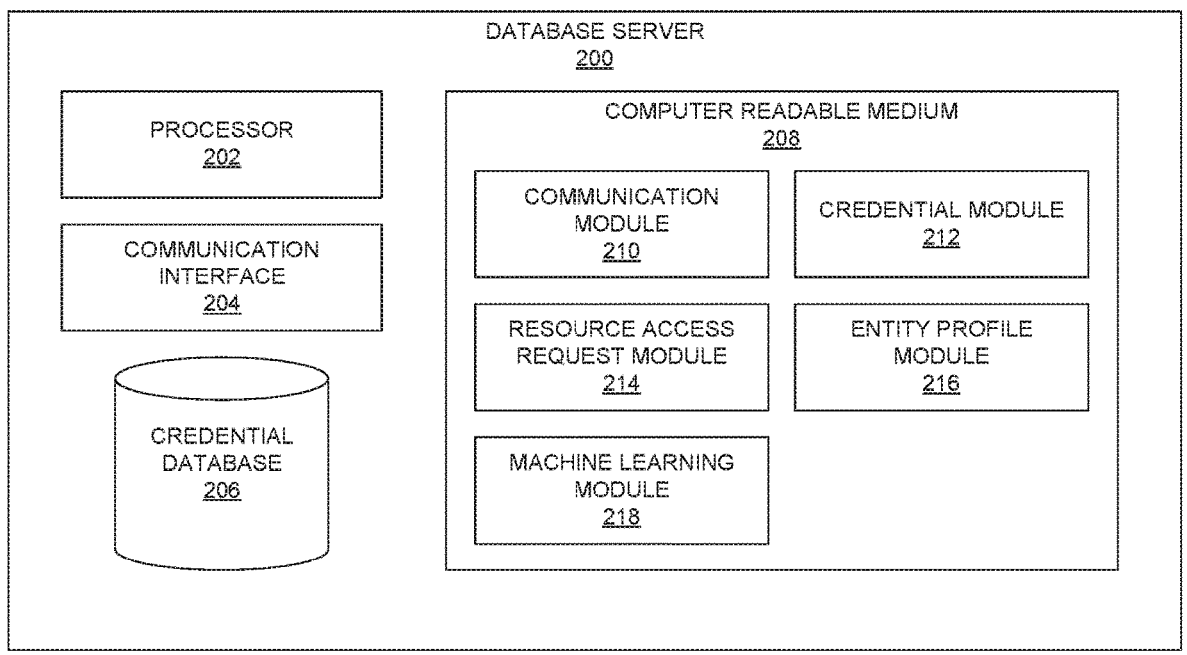
FIG. 2 shows a block diagram of a database server according to some embodiments of the invention.

FIG. 2 shows a block diagram of an exemplary database server 200 according to some embodiments of the invention. Database server 200 may comprises a processor 202, a communications interface 204, a credential database 206, and a computer readable medium 208. The computer readable medium may comprise a number of software modules, including a communication module 210, credential module 212, resource access request module 214, entity profile module 216, and machine learning module 218.

Processor 202 may be any suitable processing apparatus or device as described above. The communications interface 204 may comprise a network interface that enables the database server to communicate with other computers or systems over a network such as the Internet.

Credential database 206 may be a database or other suitable data repository of requesting entity credentials.

Database server 200 may store and manage requesting entity credentials in credential database 206. These requesting entity credentials may comprise, for example, username-password pairs or API keys used by requesting entities to access APIs and communicate with database server 200. Database server 200 may verify a received entity credential by accessing credential database 206 and verifying the existence of a matching credential. Database server 200 may revoke entity credentials by deleting the corresponding data record in credential database 206 or by flagging or otherwise indicating that the data record corresponds to a revoked credential.

Communication module 210 may comprise code that causes or enables the processor 202 to generate messages, reformat messages, and/or otherwise communicate with other entities, computers and databases. The communication module 210 may enable the database server 200 to communicate over a network according to any appropriate communication protocol, such as TCP, UDP, etc.

Credential module 212 may comprise code that causes or enables the processor 202 to receive, process, and verify received entity credentials. Credential module 212 may include code allowing the database server 200 to formulate queries for corresponding credentials in credential database 206, modify data records in credential database 206 (such as flagging or deleting data records corresponding to revoked credentials), and additionally may comprise any decision-making logic or code for determining whether to revoke a credential. For example, upon determination that an anomaly score produced by machine learning module 220 is greater than a predetermined threshold, logic or code in credential module 212 may trigger a routine or subroutine to revoke a corresponding credential in credential database 206. Credential module 212 may further comprise code enabling the database server 200 to compare two credentials (e.g., a stored credential and a credential received from a requesting entity) to determine if the two credentials match.

Resource access request module 214 may comprise code that causes or enables the processor 202 to receive, process, and enact resource access requests. For example, resource access request module 214 may comprise code enabling the database server 200 to access resource databases (e.g., resource databases 102 and 104 from FIG. 1). Resource access module 214 may comprise or otherwise store cryptographic keys or other resources needed to access resource databases and/or decrypt data records stored in resource databases. Further, resource access module 214 may comprise code allowing the database server to implement resource access requests, such as code enabling the database server 200 to list the contents of a directory or database, return a database record, or return information about the requesting entity or their database access permissions. Resource access request module 214 may additionally comprise code or logic enabling the processor 202 to determine or otherwise verify whether or not to fulfill database access requests, e.g., determining whether a requesting entity is on a blacklist, whether the requesting entity's credential is valid, etc.

Further, resource access request module 214 may comprise code that enables the processor 202 to generate access sequences, ordered collections of database access requests received by database server 200. Generating access sequences may comprise the database access server 200 evaluating timestamps associated with the database access requests and sorting the database access requests by their corresponding timestamp. The resource access module 214 may contain code or decision-making logic that allows processor 202 to determine which database access requests should be included in a particular access sequence and which database access requests should not be included. For example, in a particular access sequence, the database server 200 may include all database access requests with timestamps within a particular time range, e.g., 60 seconds, and exclude all database access requests that occur outside that time range.

Entity profile module 216 may comprise code that enables the processor 202 to determine an entity profile associated with a requesting entity. This may comprise transmitting a request or query to an entity profile database (such as entity profile database 106 from FIG. 1) and retrieving a corresponding profile. The query may include an identifier, such as an entity identifier or an entity credential. The identifier or credential may be used by the database server 200 to determine the entity profile in the entity profile database.

Machine learning module 218 may comprise code that enables the processor 202 to identify, train, and utilize machine learning models in order to identify anomalous or malicious access sequences. This may include code used by the database server 200 to identify a machine learning model corresponding to the entity profile and retrieve the machine learning model from a model cache (such as model cache 108 from FIG. 1) or any other suitable database. Machine learning module 218 may comprise code that enables the processor 202 to generate query messages used to query the model cache.

Additionally, machine learning module 218 may comprise code enabling the processor 202 to retrieve feature vectors from a feature store (such as feature store 110 from FIG. 1). These feature vectors may be paired with corresponding classifications, and may be used to train machine learning models, such as a support vector machines or isolation forests.

Further, machine learning module 218 may comprise code enabling the processor 202 to modify, initially process, normalize, or otherwise clean and convert access sequences into feature vectors that can be understood and evaluated by the machine learning model. This may include, for example, fitting data or metadata comprising the database access requests to normalized ranges or other front-end processing tasks.

Machine learning module 218 may additionally comprise code enabling the processor to utilize the retrieved machine learning model to generate an anomaly score corresponding to the access sequence and compare the anomaly score to a predetermined threshold. The anomaly score may correspond to how normal or anomalous the access sequence and resource access requests are. For example, a score of 100 may correspond to a totally anomalous access sequence, while a score of 0 corresponds to a totally normal access sequence. The predetermined threshold may be a tolerance level, indicating how tolerant database server 200 is of anomalous behavior. If the anomaly score is greater than the predetermined threshold, the processor 202 may enact a subroutine, routine, or other code in machine learning module 220 in order to prevent a requesting entity from continuing to access or request data from the resource databases.

Figure 3A:
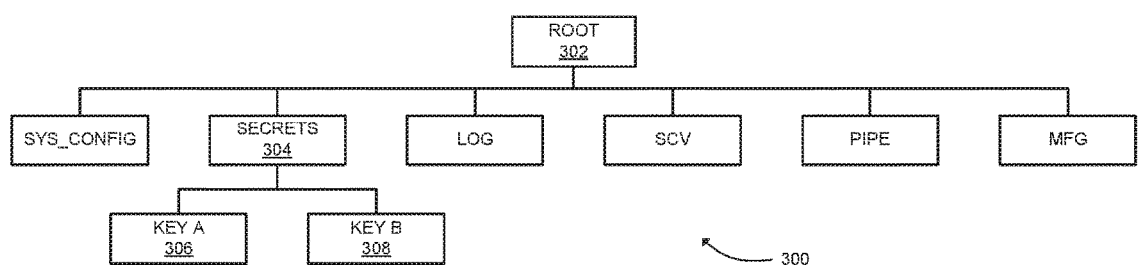
FIG. 3A shows a block diagram of an exemplary "shallow" hierarchical database.
Figure 3B:
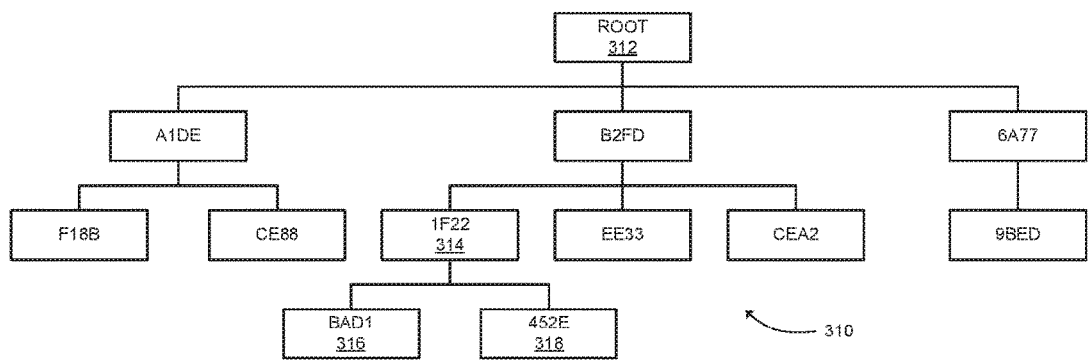
FIG. 3B shows a block diagram of an exemplary obfuscated "deep" hierarchical database according to some embodiments of the invention.

FIGS. 3A-3B illustrate the difference between a conventional shallow hierarchical database (database 300 from FIG. 3A), and a deep hierarchical database that may be employed in some embodiments of the invention (database 310 from FIG. 3B).

In the block diagram of shallow database 300 of FIG. 3A, each box corresponds to either a directory or a data record. The ROOT directory, 302, is the uppermost directory in database 300. Notably, database 300 includes a SECRETS directory 304 containing two data records corresponding to cryptographic keys, KEY A 306 and KEY B 308. Database 300 comprises two database layers, the root layer 300, containing data records SYS_CONFIG, LOG, SCV, PIPE, and MFG, along with SECRETS directory 304, and the SECRETS layer comprising KEY A 306 and KEY B 308. Shallow database 300 is vulnerable to attackers, as attackers only need to penetrate two layers to find the cryptographic keys. Further, because the directories and data records are labelled in a human readable format, an attacker can quickly identify the SECRETS directory 304 and retrieve KEY A 306 and KEY B 308.

FIG. 3B shows an example of a deep, obfuscated database 310 according to some embodiments of the invention. In FIG. 3B, the identifiers of subdirectories and data records have been replaced with aliases, identifiers that don't have any clear meaning to a human reader. This makes identifying a secrets directory (i.e., 1F22 314) and cryptographic keys (i.e., BAD1 316 and 452E 318) significantly more difficult for an attacker who is unfamiliar with the database. Further, the cryptographic keys BAD1 316 and 452E 318 are stored on a deeper layer of database 310 than corresponding KEY A 306 and KEY B 308 are stored on in database 300. This increases the amount of reconnaissance that an attacker needs to perform to locate the cryptographic keys.

In database 310 of FIG. 3B, there are three layers. The ROOT directory 312 is the upper most directory in database 310, and contains subdirectories A1DE, B2FD, and 6A77. Subdirectory A1DE contains data records F18B and CE88. Subdirectory B2FD contains subdirectory 1F22 314 (the secrets directory) and data records EE33 and CEA2. Subdirectory 6A77 contains data record 9 BED. Subdirectory 1F22 314 contains cryptographic keys BAD1 316 and 452E 318.

Typically, a legitimate requesting entity will be familiar with the structure of the resource database and the location of the needed cryptographic keys. As such, a legitimate requesting entity is not impeded by the obfuscated or deep nature of database 310. A legitimate requesting entity may request a key from database 310 with a single database access request such as "READ ROOT/B2FD/1F22/BAD1." By contrast, as stated above, an attacker or malicious requesting entity may not be familiar with the structure of the resource database, and may need to perform reconnaissance.

In database 300, reconnaissance is comparatively easy, an attacker needs to request a list of the contents of the ROOT directory 302, identify SECRETS directory 304, and read the contents of each data record in SECRETS directory 304. By comparison, for database 310, an attacker has to perform considerably more reconnaissance, listing and jumping between multiple subdirectories. Additionally, because the records and directories aren't conventionally named, the attacker cannot determine whether they have found the secrets directory or identify whether a particular data record corresponds to a secret. This not only improves the security of the system by making it more difficult for attacker's to find sensitive resources, it also improves the chance of detecting an attacker. The more reconnaissance the attacker performs, the more anomalous database access requests the attacker has to make, causing the attacker to reveal themselves to the machine learning models employed by the database server. Some embodiments of the invention may make use of deep obfuscated databases like database 310 from FIG. 3B as resource databases (e.g., resource databases 102 and 104 from FIG. 1).

Figure 4:
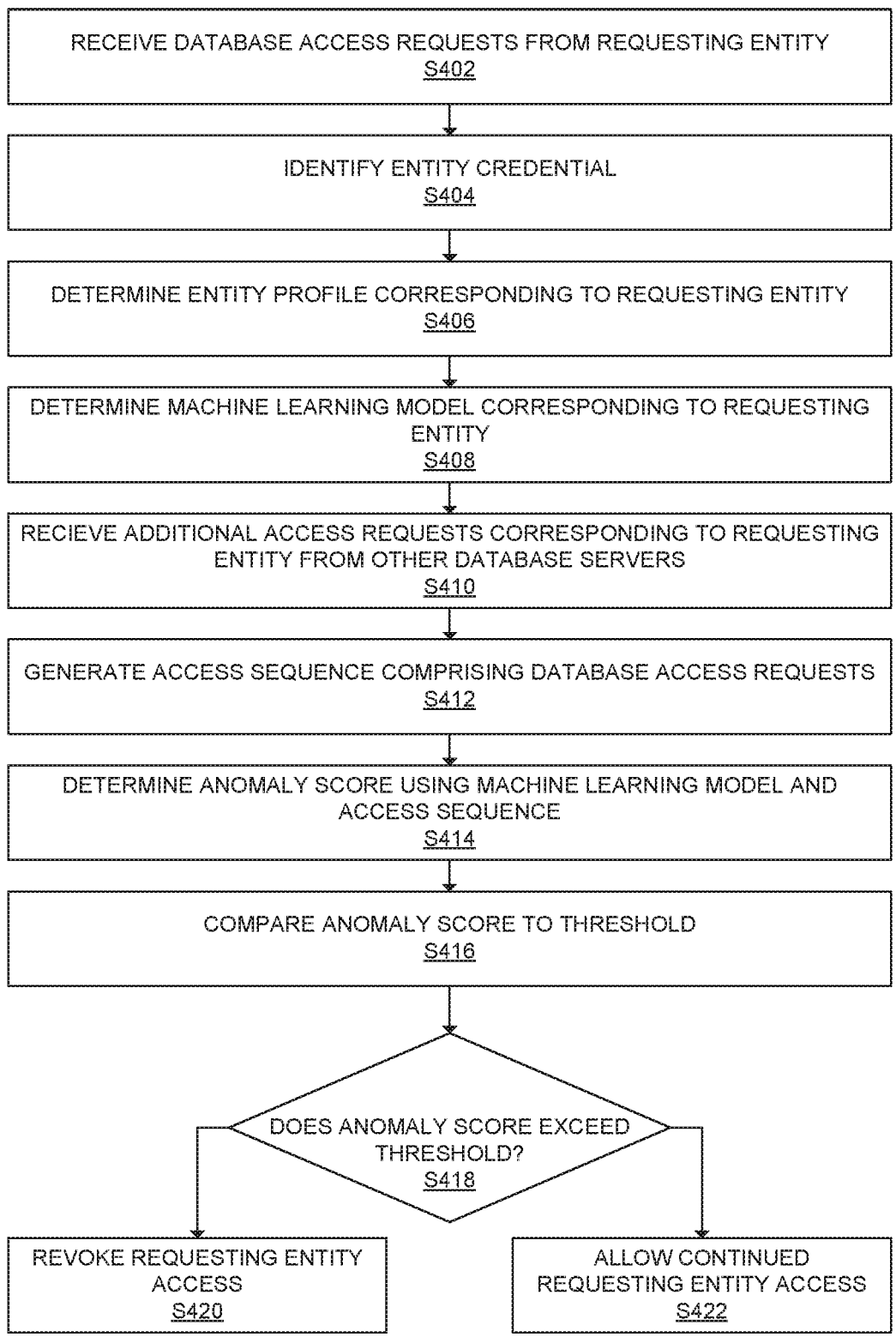
FIG. 4 shows a method of detecting anomalous access to a database according to some embodiments of the invention.

FIG. 4 shows a method 400 of evaluating resource access requests and allowing or preventing access to a resource database, performed by a database server, according to some embodiments of the invention.

At step S402, a database server (e.g., database server 112 from FIG. 1) can receive a plurality of database access requests from a requesting entity. These database access requests can be received via one or more APIs, and can include a plurality of requests to access one or more resources (e.g., sensitive resources like PII, financial records or cryptographic keys) in a database (e.g., resource database 102 from FIG. 1).

In some embodiments of the invention, one or more database access requests of the plurality of database access requests may include an entity credential. The entity credential may prove that the requesting entity is authorized to access the database. Examples of entity credentials include usernames and passwords or API keys used to access the one or more APIs. The database access requests may additionally comprise data or metadata, such as a timestamp, an identifier corresponding to the requesting entity, a location of origin (either geographical or digital, such as an IP address), a sequence number, checksum, source port, destination port, etc.

These database access requests may include, for example, requests to query the database (also referred to as database read requests). For a resource database implemented as a relational database, this may include SQL or SQL-like statements such as "SELECT 'keys' FROM 'secrets,'" a request to retrieve the 'keys' records from the 'secrets' table. In a hierarchical database, database access requests may include list requests, such as "ls/secrets," a request to list the contents of directory "secrets." The database server may access the database and return the results to the requesting entity. For example, if the requesting entity transmits a database access request including "ls/secrets," the database server may access the resource database, retrieve a list of the contents of directory "secrets" (or an error if no such directory exists), and return the list to the requesting entity.

Other examples of database access requests may include "entity information requests" and "entity capability requests." An entity information request may include a request to the database server for any information about the requesting entity or another entity. This may include a name or username associated with the entity, a title (e.g., administrator, moderator, etc.), the date that a profile associated with the entity was generated by the database server, or any other information that could be stored in a profile associated with the requesting entity. An "entity capability request" may include a request to the database server for information about the capabilities or permissions associated with the requesting entity. For example, an entity capability request may include a request that determines which directories, database layers, or records that the requesting entity is allowed or disallowed to access, whether the requesting entity can write additional data records to the resource database, etc.

At step S404, the database server can identify an entity credential corresponding to the requesting entity. The entity credential may be included in one or more of the database access requests. In some embodiments, the entity credential (such as an API key) may be provided to the API in order for the requesting entity to utilize the API to communicate with the database server. In this case, the database server may identify the entity credential via the API. The entity credential may be a username and password, unique entity identifier or serial number, or any other appropriate data that identifies the entity and proves that the entity is authorized or permitted to access the database.

At step S406, the database server can determine a requesting entity profile associated with the plurality of database access requests. The requesting entity profile may contain information about the requesting entity, such as an identifier (e.g., a username or serial number), location information (such as a physical address or IP address), and historical information regarding the requesting entity (e.g., the last time the requesting entity transmitted a resource access request or otherwise attempted to access the database, the duration the entity profile has existed, etc.). The entity profile may additionally be associated with a machine learning model corresponding to the requesting entity. Determining a requesting entity profile can comprise the database server searching an entity profile database (such as entity profile database 106 from FIG. 1) using the entity credential as a primary or foreign key, or in any suitable database query.

At step S408, the database server can determine a machine learning model corresponding to the requesting entity profile. The machine learning model may be a machine learning classifier that indicates whether or not the requesting entity's database access requests or access sequences are normal by producing an anomaly score. The anomaly score may be a score on a range such as 0-100, 0-1, or any other appropriate range. The machine learning model may be unique to the requesting entity and the requesting entity profile. The machine learning model may be trained using historical database access requests collected by the database server over the course of the requesting entity profile's existence. These historical database access requests may be stored as feature vectors in a feature store (such as feature store 110 from FIG. 1). The database server may determine the machine learning model by searching or otherwise querying a model cache (such as model cache 108 from FIG. 1) using a requesting entity identifier or entity profile identifier.

At step S410, the database server may receive a plurality of additional database access requests corresponding to the requesting entity from one or more additional database servers. As depicted in FIG. 1, resource database management systems may comprise multiple resource databases and multiple database servers. Fraudulent requesting entities or attackers may move or jump between APIs and database servers in order to find the weakest point of entry to a resource database. As such, before the database server receives the plurality of database access requests at step S402, the requesting entity may have attempted to access the database via the one or more additional database servers. These additional database access requests may be useful to the database server in identifying fraudulent or malicious access to the database by the requesting entity.

The database server may transmit an electronic request message for the additional database access requests to the one or more additional database servers, and receive the additional database access requests in one or more electronic response messages from the one or more additional database servers. In some embodiments, the database server and one or more additional database servers may belong to the same local communication network, such as a local area network (LAN). In other embodiments, the database servers may be remote and may communicate over a network such as the Internet.

Alternatively or additionally, the database server and the one or more additional database servers may maintain a shared access request database, memory pool, or log file containing all database access requests made to each database server. When the database server or the one or more additional database servers receive a database access request, it may write a record of the database access request to the access request database, memory pool, or log file. The database server may receive the plurality of additional database access requests by retrieving the plurality of additional database access requests from the shared access request database, memory pool, or log file.

The plurality of additional database access requests may comprise requests to access one or more resources in additional databases. Like the plurality of database access requests received in step S402, the plurality of additional database access requests can be receive via one or more APIs. The plurality of additional database access requests may include entity credentials, data or metadata (such as a timestamp, source port, destination port, etc.), among others. The resources in the additional databases may be the same or similar as resources stored in the database, such as cryptographic keys, financial records, or PII. The additional database access requests may include query requests, read requests, list requests, entity information requests, and entity capability requests, among others. These requests may be understood with reference to the description above.

At step S412 the database server can generate an access sequence comprising the database access requests and additional database access requests. The access sequence may comprise a chronologically ordered list of database access requests and additional database access requests. Access sequences may comprise any number of database access requests. For example, a shorter access sequence may comprise two database access requests, while a longer access sequence may comprise 100 database access requests. The access sequence may be ordered based off timestamps in the database access requests and additional database access requests. The access sequence is a strong indicator of the behavior of the requesting entity. As discussed above, legitimate requesting entities will typically produce database access requests that comprise a short, concise sequence, with no access requests beyond what is necessary to extract the relevant resource from the resource database. Fraudulent requesting entities or attackers however, typically need to determine the location of sensitive resources in the resource database before extracting them. As a result, the database access requests produced by attackers are typically longer and involve more reconnaissance, such as listing the contents of directories. Further, attackers are more likely to make access requests across a larger number of APIs or across multiple database servers. Evaluating access sequences rather than individual database access requests improves the database server's ability to detect fraudulent or malicious activity, especially when compared to conventional database security systems, which do not evaluate access sequences.

At step S414 the database server can apply the access sequence as a feature vector input to the identified machine learning model to generate an anomaly score. As stated above, the identified machine learning model may be a classifier model uniquely associated with the requesting entity, requesting entity profile, or requesting entity credential. For example, the machine learning model may be a support vector machine (SVM), isolation forest, etc. In some embodiments, the machine learning model may be a hybrid model or ensemble classifier, comprising a combination of models that collectively produce a single classification, using an ensemble method such as bagging, voting, weighted average, random selection, etc. The machine learning model may evaluate the access sequence and classify the access sequence as anomalous or normal. In some embodiments, the classification may be fuzzy, and may take on any number of values between anomalous and normal (e.g., 80% normal, 20% anomalous, etc.). In some embodiments, the anomaly score may be a normalized value associated with the classifications. For example, a totally normal access sequence may be assigned an anomaly score of 0, a totally anomalous access sequence may be assigned an anomaly score of 100, and an access sequence that is 50% normal and 50% anomalous may be assigned an anomaly score of 50.

At step S416 the database server can compare the anomaly score to a predetermined threshold. The predetermined threshold indicates the level of anomalous activity that can be tolerated by the database server. For example, a predetermined threshold of 50 may indicate that database access requests should be accepted as non-anomalous, provided that the access sequence is less than 50% anomalous. In a system where anomalous access is more severe (e.g., a secret or top-secret database), the predetermined threshold may be set at a lower value (e.g., 5) in order to further improve security.

At step S418, the database server can determine whether the anomaly score exceeds the predetermined threshold or not. If the anomaly score exceeds the predetermined threshold, process flow proceeds to step S420. If the anomaly score does not exceed the predetermined threshold, process flow proceeds to step S422.

At step S420, if the anomaly score is greater than the predetermined threshold, the database server can prevent the requesting entity from accessing the database. The database server can maintain a blacklist or whitelist of requesting entities that are allowed access to the database. Additionally, the requesting entity profile can contain a field or other value that indicates the requesting entity's ability to access the database. The database server can prevent the requesting entity from accessing the database by modifying the whitelist (e.g., removing the requesting entity from the whitelist), modifying the blacklist (e.g., adding the requesting entity to the blacklist), or modifying the requesting entity profile (e.g., changing a flag or indicator value that indicates the requesting entity is banned or otherwise prevented from accessing the database). Alternatively or additionally, the database server can revoke the entity credential. Revoking the entity credential may involve indicating that the entity credential is no longer valid, for example, flagging or removing the entity credential from an entity credential database.

At step S422, if the anomaly score is less than the predetermined threshold, the database server can allow the requesting entity to access the database. If the anomaly score does not exceed the predetermined threshold, it may indicate that the requesting entity is a legitimate requesting entity. Allowing the requesting entity to access the database may comprise continuing to monitor and service database access requests produced by the requesting entity, as well as communicating the results of those database access requests back to the requesting entity.

Tests were conducted in detecting attack sequences, the results of which are described below with reference to FIGS. 5-7. These tests involved evaluating the performance of eight different machine learning models corresponding to three different entity profiles. The machine learning models were tested on their ability to detect known attack sequences (characterized by attacker reconnaissance and retrieval), and unknown attack sequences, comprising one million anomalous events for each profile type. One-class SVM models with an RBF kernel performed the best at detecting attack sequences overall.

As stated above, eight different machine learning models were tested. These machine learning models corresponded to two different types of machine learning models: isolation forest; and one-class SVM. Two isolation forest models were tested corresponding to 200 and 300 samples. Six one-class SVM models were tested, three using an RBF kernel with gamma of 0.1, 0.3, and 0.9, two using a polynomial kernel with gamma of 0.1 and 0.3, and one using a sigmoid kernel with gamma of 0.1.

These eight machine learning models were trained for three entity profiles. Two entity profiles corresponded to application services. The third entity profile corresponded to a privileged user (e.g., a system administrator). These entity profiles were generated and trained using production data (e.g., recorded database access requests) from a secret management system. This production data corresponded to normal database access requests or access sequences.

The production data was split into training and test sets. For the application services, 80% of the production data was used as training data, and the remaining 20% was used as test data. For the privileged user, 90% of the production data was used as training data, and the remaining 10% was used as test data.

Further, two attack data sets were generated in order to evaluate the machine learning models. The first attack data set corresponded to systematic attacks. This systematic attack data set comprised attack sequences, sequences of database access requests that an attacker would perform to detect the location of a secret or sensitive resource and extract the sensitive resource, these attack sequences had characteristic retrieval patterns or attacks, as well as reconnaissance patterns, involving the attacker attempting to locate secrets or sensitive resources before extracting those secrets or sensitive resources. The goal of the testing procedure was for the machine learning models to detect the attack sequence before extraction occurred.

The second attack data set was a set of random noise, corresponding to unknown future attacks on the resource database. One million access sequences were generated. Roughly 560,000 access sequences were flagged as "malicious anomalies," corresponding to access sequences that pertain to retrieving sensitive resources. 440,000 access sequences were flagged as "benign anomalies" corresponding to unusual, but less risky behavior for an entity. For the privileged user, the access sequences for the second attack data set all took place outside of normal business hours.

The first attack data set was combined with the production data test set to form the "validation set," and the second attack data set was used as the "test set." The machine learning models were tested on the validation set and test set data and the following metrics were evaluated:

Validation Accuracy: The percentage of anomalies correctly identified by the model.
TPR (True Positive Rate): The number of normal events correctly identified.
FPR (False Positive Rate): The number of normal events falsely identified as anomalies.
FNR (False Negative Rate): The number of anomalous events falsely identified as normal events.
TNR (True Negative Rate): The number of anomalous events correctly identified as anomalies.
Sequences detected: The number of attack sequences the model was able to predict. A success is identified if the model identifies the first "Retrieval" attack or any "Recon" attacks before the first "Retrieval" attack.

F1 Anomaly: The F1 score with respect to anomalies. A standard F1 score showcases how well a model does for normal events.

The results for application service 1, application service 2, and the privileged user are shown in FIGS. 5-7.

FIG. 5 shows a table summarizing the results for application service 1. Each model, except for the one-class SVM with sigmoid kernel successfully detected all attack sequences. Most models performed well, evidenced by high TPR and TNR on the validation set. The one-class SVM models with RBF kernels, as well as the both isolation forest models performed the best. Particularly the one-class SVM with RBF kernel and gamma equal to 0.1, which achieved validation accuracy of 98.145%, a TPR of 98.45%, and a TNR of 100% on the validation data. Isolation forests typically give a more generalized model with increasing sample size, whereas one-class SVM typically gives a generalized model with decreasing gamma value. The fact that the best models were isolation forest with 300 samples and one-class SVM with gamma 0.1 implies that the test data was not overfit too much.

FIG. 6 shows a table summarizing the results for application service 2. The models overall performed worse for application service 2 than they did for application service 1. The isolation forest with 200 samples detected 40% of attack sequences, the one-class SVM with a sigmoid kernel detected 60% of attack sequences, and all other models detected 100% of attack sequences. As in FIG. 5, the one-class SVMs with RBF kernels performed the best. Particularly, the one-class SVM with RBF kernel and gamma of 0.1 achieved a TPR of 91.84% and a TNR of 100% on the validation data, and a FPR of 99.45% and a TNR of 100% on the test data. In FIGS. 5-6, the one-class SVM with polynomial kernel generally performed well on the validation sets, but not as well on the test sets, indicating that one-class poly kernel SVMs may be useful in detecting known attacks, but not unknown future attacks. Further, the models that performed well on the validation set had relatively low false positive rates. The service account shown in FIG. 5 had less than a 6% false positive rate for almost all models, and the service account shown in FIG. 6 had less than a 10% false positive rate for its best models. This implies that these models will be robust, and will require less human triaging and diagnostics during production.

FIG. 7 shows a table summarizing the results for the privileged user. Unlike the application services, the privileged user has more variance in their behavior. Privileged users can, for example, view other profiles, look at system statistics, create accounts, remove permissions, as well as other activities. This causes privileged user behavior to be noisier, despite it reflecting normal behavior for privileged users. Consequently, it is more difficult to differentiate between normal access sequences and attack sequences. Both isolation forest models detected 0% of attack sequences. The one-class SVM with RBF kernel and gamma 0.1 detected 40% of attack sequences, one-class SVMs with RBF kernels and gammas 0.3 and 0.9 detected 100% of attack sequences, one class SVMs with polynomial kernels detected 80% of attack sequences, and the one-class SVM with sigmoid kernel detected 20% of attack sequences.

Notably, multiple models can be combined in order to improve overall performance, particularly as some models detect known attacks well, and other models detect unknown attacks well. For the application services, one-class SVMs with polynomial kernels can be used to supplement decision making when detecting known attacks, while a database server can rely on one-class SVM with RBF kernel for other, unknown attacks.

Additionally, detection of anomalies for privileged users can be improved by combining models. For instance, one-class SVM with polynomial kernel and gamma value 0.3 missed 20% of attack sequences, which were detected by the one-class SVM with sigmoid kernel and gamma value 0.1. Combining these two models can improve the overall detection rate. Additionally, these models can be combined with the one-class SVM RBF kernel models with gamma values 0.3 and 0.9 to further improve performance. The one-class SVM RBF kernel model with gamma value 0.9 performed the best on the test set but had a 100% false positive rate, whereas the combination had 99.87% accuracy with a 44% false positive rate. Effectively, performance (with respect to validation accuracy) can be improved while still maintaining the best false positive rate. This combination can be accomplished using a simple voting algorithm, but different ensembling methods can be used to further improve the accuracy and false positive rate.

These experiments demonstrate the strength of entity behavior profiling using machine learning models. In many cases, attack sequences and malicious anomalies were detected with a high degree of accuracy. This demonstrates an advantage over conventional database security systems, many of which cannot detect insider attacks or attackers once they have managed to breach the external security perimeter. By accurately identifying attack sequences and anomalous database access requests, embodiments of the invention can better protect secret or sensitive information, such as cryptographic keys or PII.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses, each being a subsystem, with internal components.

A computer system can include a plurality of the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

What is claimed is:

1. A method comprising:
receiving, by a server, a plurality of access requests from a requesting entity, wherein the plurality of access requests are received via one or more APIs and are a plurality of requests to access one or more resources in an obfuscated database;
determining, by the server, a requesting entity profile associated with the plurality of access requests;
determining, by the server, a machine learning model corresponding to the requesting entity profile;
generating, by the server, an access sequence, wherein the access sequence comprises an ordered sequence of the plurality of access requests;
determining, by the server, an anomaly score by applying the access sequence as an input to the machine learning model;
comparing, by the server, the anomaly score to a predetermined threshold;
if the anomaly score is greater than the predetermined threshold, preventing, by the server, the requesting entity from accessing the obfuscated database; and
if the anomaly score is less than the predetermined threshold, allowing, by the server, the requesting entity to access the obfuscated database, wherein the obfuscated database comprises a plurality of layers and wherein the one or more resources are stored in a deep layer of the obfuscated database.

2. The method of claim 1, wherein the plurality of access requests include a credential, wherein the server determines the requesting entity profile associated with the plurality of access requests using the credential.

3. The method of claim 1, wherein preventing the requesting entity from accessing the obfuscated database comprises revoking a credential associated with the requesting entity, wherein the credential grants the requesting entity access to the obfuscated database.

4. The method of claim 1, further comprising determining, by the server, a plurality of timestamps corresponding to the plurality of access requests, wherein the access sequence is ordered based on the plurality of timestamps.

5. The method of claim 1, wherein the one or more APIs correspond to one or more different applications that access the obfuscated database.

6. The method of claim 1, further comprising receiving a plurality of additional database access requests from one or more additional database servers, wherein the plurality of additional database access requests are a plurality of additional requests to access one or more resources stored in one or more additional databases.

7. The method of claim 1, wherein determining, by the server, the machine learning model corresponding to the requesting entity profile comprises querying a model cache using the requesting entity profile or a requesting entity identifier corresponding to the requesting entity profile, the model cache storing a plurality of machine learning models corresponding to a plurality of entities.

8. The method of claim 1, wherein the plurality of access requests include one or more API identifiers corresponding to the one or more APIs.

9. A server comprising:
a processor; and
a non-transitory computer readable medium coupled to the processor, the non-transitory computer readable medium comprising code, executable by the processor, for implementing a method comprising:
receiving a plurality of access requests from a requesting entity, wherein the plurality of access requests are received via one or more APIs and are a plurality of requests to access one or more resources in an obfuscated database;

determining a requesting entity profile associated with the plurality of access requests;

determining a machine learning model corresponding to the requesting entity profile;

generating an access sequence, wherein the access sequence comprises an ordered sequence of the plurality of access requests;

determining an anomaly score by applying the access sequence as an input to the machine learning model;

comparing the anomaly score to a predetermine threshold;

if the anomaly score is greater than the predetermined threshold, preventing the requesting entity from accessing the obfuscated database; and if the anomaly score is less than the predetermined threshold, allowing, by the server, the requesting entity to access the obfuscated database, wherein the obfuscated database comprises a plurality of layers and wherein the one or more resources are stored in a deep layer of the obfuscated database.

10. The server of claim 9, wherein the plurality of access requests includes a credential, wherein the server determines the requesting entity profile associated with the plurality of access requests using 4 the credential.

11. The server of claim 9, wherein preventing the requesting entity from accessing the obfuscated database comprises revoking a requesting entity credential associated with the requesting entity, wherein the requesting entity credential grants the requesting entity access to the obfuscated database.

12. The server of claim 9, wherein the method further comprises determining a plurality of timestamps corresponding to the plurality of access requests, wherein the access sequence is ordered based on the plurality of timestamps.

13. The server of claim 9, wherein the one or more APIs correspond to one or more different applications that access the obfuscated database.

14. The server of claim 9, wherein the method further comprises receiving a plurality of additional database access requests from one or more additional database servers, wherein the plurality of additional database access requests are a plurality of additional requests to access one or more resources stored in one or more additional databases.

15. The server of claim 9, wherein determining the machine learning model corresponding to the requesting entity profile comprises querying a model cache using the requesting entity profile or a requesting entity identifier corresponding to the requesting entity profile, the model cache storing a plurality of machine learning models corresponding to a plurality of entities.

16. The server of claim 9, wherein the plurality of access requests include one or more API identifiers corresponding to the one or more APIs.

* * * * *